Patented July 22, 1924.

1,501,915

UNITED STATES PATENT OFFICE.

YASUJURO NIKAIDO, OF BAY CITY, MICHIGAN, ASSIGNOR TO MICHIGAN CHEMICAL COMPANY, A CORPORATION OF MICHIGAN.

PROCESS OF MAKING FERTILIZERS.

No Drawing.   Application filed August 28, 1922.  Serial No. 584,865.

*To all whom it may concern:*

Be it known that I, YASUJURO NIKAIDO, a citizen of Japan, and a resident of Bay City, in the county of Bay and State of Michigan, U. S. A., have made a new and useful Invention in Processes of Making Fertilizers, of which the following is a specification.

The invention relates to a process of making fertilizers, and has for its primary object the provision of an improved process for making a fertilizer containing a relatively high percentage of nitrogen and potash from beet sugar residue in a form which is not sticky and does not become sticky, and which may, therefore, be stored and handled conveniently. Heretofore when this has been attempted with a mixture of phosphate or phosphate rock with a sufficient proportion of beet sugar residue to give the desired percentage of nitrogen and potash, the resultant mixture has either been so sticky as to be handled and applied only with difficulty, or has been of such a character that it rapidly absorbed moisture from the atmosphere and thus soon arrived at such sticky condition. My method is designed to overcome this difficulty and permit the use of a relatively high percentage of the residue with acid phosphate (or its equivalent) without producing a wet sticky product and without producing a product which will absorb sufficient moisture from the atmosphere to become damp and sticky. This result is accomplished by the application of acid and heat in such way as to destroy the organic substances in the residue, which, in my opinion, are responsible for the sticky quality to the mixture as heretofore made, the application of the acid also serving to prevent the loss of the nitrogen, which would otherwise occur under the application of the relatively high temperature employed as hereinafter set forth.

In carrying out the process one procedure is as follows: Ten parts of beet residue are evaporated until free from water, and heated up to about 225° C. This material is then treated with two parts of sulphuric acid and the heating continued, at the same time for about thirty minutes or longer, the mass then being cooled slightly and treated with warm water and stirred until the whole mass becomes pasty. This mass of pasty material is then poured over ten parts of acid phosphate, containing 16 per cent of phosphoric acid, placed in a specially designed steam jacketed apparatus wherein the beet residue and phosphate are thoroughly mixed, dried and granulated at a temperature not exceeding 100° C.

This fertilizer contains approximately the following plant foods:

|  | Per cent. |
|---|---|
| Nitrogen (N) | 2.00 |
| Phosphoric acid ($P_2O_5$) | 8.00 |
| Potash ($K_2O$) | 4.00 |

The fertilizer thus obtained does not absorb moisture from the atmosphere, or at least the absorption is relatively so low that the powder does not become sticky, and remains permanently in powder form, so that the material may be stored and handled conveniently.

In my opinion, the treating of the residue with the sulphuric acid tends to destroy organic substances, which would otherwise impart a sticky quality to the product, the sulphuric acid being one of the most powerful destructive agents of organic substances. The application of the relatively high temperature to the material, ranging from 220° to 250° C., not only serves to drive off the moisture contained in the residue, but also assists in destroying the organic substances, which I regard as responsible for the sticky quality of the product when beet residue is applied to acid phosphate or phosphate rock. The application of high temperature after the treatment with the sulphuric acid also intensifies the action of the acid in destroying the organic substances.

A further object in treating the residue with the sulphuric acid is to arrest the nitrogen which is evolved from nitrogenous organic substances when subjected to high temperatures. When heated to a high temperature, ranging upwards of 200° C., the nitrogenous organic substances in the residue partially decompose, giving off nitrogen in the form of ammonia or amine gases, which, combined with the sulphuric acid, form sulphate of ammonium and hydrosulphate of amines, thereby preventing a loss of nitrogen.

The acid phosphate is preferably the "super phosphate" of commerce, consisting of acid calcium phosphate and calcium sulphate, the percentage of phosphoric acid contained in this compound ranging from sixteen to forty-four, according to the raw material used in the production of the compound and the process of treatment. It will be understood that other materials containing phosphoric acid might be used in place of the acid phosphate, as above described, and that in the use of the term "acid phosphate" is intended to be included those substances containing phosphoric acid which could be used in place of the "super phosphate." Among such materials are ground phosphate rock, ground bone, slaughter house tannage, ground Thomas slag, dried fish scrap, bone black and guano.

It will also be understood that the ratio of acid phosphate to beet residue may be varied, depending upon the character of the fertilizer desired. The proportion of acid phosphate to beet residue may range from one part of acid phosphate to one part of residue, as heretofore described, to one part of acid phosphate to nine parts of beet residue. When the latter extreme proportion of beet residue is employed there is a slight tendency for the product to become sticky and collect moisture, so that this appears to be about the limit of the proportion in this direction.

As illustrative of the various proportions which may be satisfactorily used, reference is directed to the following table, setting forth the proportions and the plant foods in the finished product when an acid phosphate is used containing sixteen percent of phosphoric acid:

| Beet residue. | Acid phosphate 16% P$_2$O$_5$. | Nitrogen. | Phos. acid. | Potash. |
|---|---|---|---|---|
| Parts. | Parts. | Per cent. | Per cent. | Per cent. |
| 5 | 5 | 1.7 | 8.0 | 4.0 |
| 6 | 4 | 2.16 | 6.4 | 4.8 |
| 7 | 3 | 2.52 | 4.8 | 5.6 |
| 8 | 2 | 3.39 | 3.2 | 6.4 |
| 9 | 1 | 3.80 | 1.6 | 7.2 |

Instead of using acid phosphate which contains 16 percent of phosphoric acid, phosphate containing a higher percent of acid may be used or a combination of two phosphates containing different percentages of acid. For instance, it is feasible to use a phosphate made up in part of the 16 percent acid material and in part of the 44 percent acid material. Following is a table showing such a modification:

| Beet residue. | Acid phosphate 16% P$_2$O$_5$. | Acid phosphate 44% P$_2$O$_5$. | Nitrogen. | Phos. acid. | Potash. |
|---|---|---|---|---|---|
| Parts. | Parts. | Parts. | Per cent. | Per cent. | Per cent. |
| 5 | 5.00 | ---- | 1.70 | 8.0 | 4.0 |
| 6 | 3.40 | 0.60 | 2.16 | 8.0 | 4.8 |
| 7 | 1.85 | 1.15 | 2.52 | 8.0 | 5.6 |
| 8 | 0.25 | 1.75 | 3.39 | 8.0 | 6.4 |
| 9 | ---- | 1.00 | 3.80 | 4.4 | 7.2 |

What I claim is:

1. The process of making a fertilizer in solid form, which consists in treating concentrated beet sugar residue with sulphuric acid and heating at a temperature upwards of 200° C., mixing with acid phosphate and then drying the product.

2. The process of making a fertilizer in solid form, which consists in treating concentrated beet sugar residue with sulphuric acid and heating at a temperature upwards of 200° C., mixing with acid phosphate and then drying the product, the amount of phosphate by weight being at least approximately equal to the amount of acid phosphate.

3. The process of making a fertilizer in solid form, which consists in treating concentrated beet sugar residue with sulphuric acid and heating at a temperature upwards of 200° C., mixing with acid phosphate and then drying the product, the proportion of phosphate to residue by weight being one part of phosphate to from one to nine parts of residue.

In testimony whereof, I have hereunto subscribed my name this 19th day of Aug., 1922.

YASUJURO NIKAIDO.